United States Patent
Iwaida et al.

(10) Patent No.: US 6,795,297 B2
(45) Date of Patent: Sep. 21, 2004

(54) ELECTRODE SHEET, METHOD FOR MANUFACTURING THEREOF, POLARIZABLE ELECTRODE AND ELECTRIC DOUBLE-LAYER CAPACITOR

(75) Inventors: Manabu Iwaida, Saitama (JP); Shigeki Oyama, Saitama (JP); Kenichi Murakami, Saitama (JP); Kouki Ozaki, Aichi (JP); Masanori Tsutsui, Aichi (JP)

(73) Assignees: Honda Motor Co., Ltd., Tokyo (JP); Daido Metal Company Ltd., Aichi (JP)

( * ) Notice: Subject to any disclaimer, the term of this patent is extended or adjusted under 35 U.S.C. 154(b) by 0 days.

(21) Appl. No.: 10/722,130

(22) Filed: Nov. 26, 2003

(65) Prior Publication Data

US 2004/0136142 A1 Jul. 15, 2004

(30) Foreign Application Priority Data

Nov. 29, 2002 (JP) ........................................ 2002-349261

(51) Int. Cl.$^7$ ................................................ H01G 9/00
(52) U.S. Cl. ...................... 361/502; 361/503; 361/508; 361/509; 361/511; 361/512; 361/520
(58) Field of Search ................................ 361/502, 503, 361/504, 508, 509, 511, 512, 516, 520, 521, 523, 525, 528, 433

(56) References Cited

U.S. PATENT DOCUMENTS

| | | | | | |
|---|---|---|---|---|---|
| 5,930,108 | A | * | 7/1999 | Kurzweil et al. | 361/502 |
| 6,392,868 | B2 | * | 5/2002 | Ohya et al. | 361/502 |
| 6,466,429 | B1 | * | 10/2002 | Volfkovich et al. | 361/502 |
| 6,657,850 | B2 | * | 12/2003 | Nakazawa et al. | 361/502 |
| 6,687,116 | B2 | * | 2/2004 | Hudis | 361/502 |

FOREIGN PATENT DOCUMENTS

| JP | 7-105316 | 11/1995 |
|---|---|---|
| JP | 2001-267187 | 9/2001 |

* cited by examiner

*Primary Examiner*—Anthony Dinkins
*Assistant Examiner*—Nguyen T. Ha
(74) *Attorney, Agent, or Firm*—Arent Fox PLLC

(57) ABSTRACT

The present invention provides an electrode sheet for an electric double-layer capacitor. The electrode sheet is molded from granules which are produced from ingredients including an electrochemically active material, an electrically conductive filler and a binder. And the electrode sheet is bonded with a collector foil so as to form a polarizable electrode which is rolled or bent so as to be applied to the electric double-layer capacitor. In the present invention, a coefficient of elongation S for the polarizable electrode is adapted to be greater than (R+T)/R and less than or equal to 1.11, where R represents a curvature of an inscribed circle at a bent portion of the polarizable electrode and T represents a thickness of the polarizable electrode.

7 Claims, 12 Drawing Sheets

$180° - \alpha \leqq 100°$ $180° - \alpha > 100°$

FIG.9

| Kneading Time Period(min) | Coefficient of Elongation | Contact Angle(deg.) | Efficiency for Voltage Maintenance(%) |
|---|---|---|---|
| 2 | 1.023 | 10 | 76 |
| 4 | 1.056 | 35 | 88 |
| 6 | 1.082 | 60 | 92 |
| 8 | 1.097 | 86 | 92 |
| 10 | 1.078 | 101 | 89 |
| 20 | 1.038 | 28 | 83 |

FIG.10

| TEFRON Mass Ratio(%) | Coefficient of Elongation | Contact Angle(deg.) | Efficiency for Voltage Maintenance(%) |
|---|---|---|---|
| 6 | 1.065 | 72 | 88 |
| 10 | 1.097 | 86 | 92 |
| 12 | 1.11 | 98 | 93 |
| 16 | 1.132 | 113 | 92 |

FIG.11

| | Mass Ratio | Kneading Time Period(min.) | Coefficient of Elongation | Contact Angle (deg.) | Efficiency for Voltage Maintenance(%) |
|---|---|---|---|---|---|
| Reference 1 | 82:8:10 | 2 | 1.023 | ≤10 | 76 |
| Reference 2 | 82:8:10 | 4 | 1.056 | 35 | 88 |
| Sample 2 | 82:8:10 | 6 | 1.082 | 60 | 92 |
| Sample 1 | 82:8:10 | 8 | 1.097 | 86 | 92 |
| Reference 3 | 82:8:10 | 10 | 1.078 | 101 | 89 |
| Reference 4 | 82:8:10 | 20 | 1.038 | 28 | 83 |
| Sample 3 | 86:8:6 | 8 | 1.065 | 72 | 92 |
| Sample 4 | 80:8:12 | 8 | 1.11 | 98 | 93 |
| Reference 5 | 76:8:16 | 8 | 1.132 | 113 | 92 |

ELECTRODE SHEET, METHOD FOR MANUFACTURING THEREOF, POLARIZABLE ELECTRODE AND ELECTRIC DOUBLE-LAYER CAPACITOR

FIELD OF THE INVENTION

The present invention relates to an electrode sheet for an electric double-layer capacitor, a method for its manufacturing, a polarizable electrode and an electric double-layer capacitor using the polarizable electrode. Specifically, the present invention focuses on the application of polarizable electrode to an electric double-layer capacitor of rolling type and the like, which require a process of rolling or bending of the polarizable electrode.

BACKGROUND OF THE INVENTION

An electric double-layer capacitor, which has high capacitance of farad class, excellent characteristics of charge/discharge cycle and the capability of undergoing rapid charge, has been used for a backup power supply of electronic component, an onboard battery for a vehicle (an energy buffer) and the like.

An electric double-layer capacitor is briefly described referring to FIG. 1.

FIG. 1 is a sectional view showing the main structure of an electric double-layer capacitor.

As shown in FIG. 1, an electric double-layer capacitor 101 includes a casing 102 housing a pair of carbon electrodes (polarizable electrodes) 104 which interposes a separator 103, and a pair of collectors (elements) 105. And the casing 102 is filled with an ion conductive electrolytic solution. The electric double-layer capacitor 101 employs electric charges (shown by + and − in FIG. 1) as dielectrics in a normal capacitor, which are generated at an interface between the solid carbon electrodes 104 and the liquid electrolytic solution, and spaced at a distance of molecule.

Electrolytic solutions used for electric double-layer capacitors are roughly categorized into an aqueous electrolytic solution made of a dilute sulfuric acid added with an electrolyte and an organic electrolytic solution made of an organic solvent added with an electrolyte. An appropriate type of electrolytic solution is selectably applied to an electric double-layer capacitor taking into account its usage. An electric double-layer capacitor using an aqueous electrolytic solution is advantageous in terms of internally lower electric resistance and higher power density. On the other hand, an organic electrolytic solution, which allows a higher withstand voltage per cell, is advantageous in terms of energy density. It also allows selection of inexpensive and light metals such as an aluminum alloy for a casing.

A method for manufacturing an electrode sheet is generally used, which has a process of mixing an electrochemically active material such as activated carbon, an electrically conductive filler such as carbon black and a binder such as polytetrafluoroethylene (PTFE).

It is required of the electrode sheet, which is applied to an electric double-layer capacitor in a form of rolled electrode, to possess high efficiency in terms of voltage maintenance within a predetermined voltage or self discharge over a long period of time.

For example, Japanese Published Patent application 2001-267187 reports that efficiency for voltage maintenance was improved by controlling the tensile strength of an electrode. Also Japanese Patent Publication 07-105316 (Japanese Published Patent Application 63-107011) shows that porosity or Gurley number was selected as a parameter so as to improve the performance of an electrode sheet.

However, since the method reported in the former document, which introduced only the tensile strength for the improvement, was not able to guarantee the durability for deformation, an amount of falling particles tended to increase. In addition, pressure acting locally on a separator affected the efficiency for voltage maintenance adversely.

On the other hand, the parameter selected by the latter document did not sufficiently explain the interaction between an electrode and an electric double-layer capacitor.

SUMMARY OF THE INVENTION

The present invention provides an electrode sheet which is applied to an electric double-layer capacitor in a form of a rolled element or an element subjected to bending process, and its manufacturing method. The electrode sheet not only is resistant to a crack but also has high efficiency in terms of voltage maintenance. Also the present invention provides a polarizable electrode made of electrode sheets, which has high efficiency for voltage maintenance, and an electric double-layer capacitor.

As a result of study, it has been discovered that the problems described above can be solved by controlling the coefficient of elongation for a polarizable electrode within a predetermined range.

An aspect of the present invention provides an electrode sheet for an electric double-layer capacitor. The electrode sheet is molded from granules which are produced from ingredients including an electrochemically active material, an electrically conductive filler and a binder. And the electrode sheet is bonded with a collector foil so as to form a polarizable electrode which is rolled or bent so as to be applied to the electric double-layer capacitor. In this aspect of the present invention, a coefficient of elongation S for the polarizable electrode is adapted to be greater than $(R+T)/R$ and less than or equal to 1.11, where R represents a curvature of an inscribed circle at a bent portion of the polarizable electrode and T represents a thickness of the polarizable electrode.

The electrode sheet described above not only is resistant to a crack while it is under a process of rolling or bending but also has high efficiency in terms of voltage maintenance. The term "coefficient of elongation" is intended to mean a coefficient of elongation at the fracture point relative to the original length.

Another aspect of the present invention provides an electrode sheet, in which a contact angle is equal to or less than 100 degrees when the contact angle is defined as (180-ALPHA) degrees, where ALPHA represents an apex angle of a droplet of an electrolytic solution for an electric double-layer capacitor, and when the droplet lies on the electrode sheet.

The electrode sheet described above allows manufacturing of an electric double-layer capacitor that has lower electric resistance and stable performance.

Still another aspect of the present invention provides a method for manufacturing an electrode sheet for an electric double-layer capacitor. The electrode sheet is molded from granules which are produced from ingredients including an electrochemically active material, an electrically conductive filler and a binder. And the electrode sheet is bonded with a collector foil so as to form a polarizable electrode which is rolled or bent so as to be applied to the electric double-layer capacitor. The method includes the following steps:

(a) kneading the ingredients so that the binder is subjected to fibrillation, and molding a lump out of the ingredients after the fibrillation;

(b) crushing the lump into granules for the electrode sheet of the electric double-layer capacitor; and (c) forming the granules into the electrode sheet.

In this aspect of the present invention, one of a period of time and strength of kneading at the step (a) is adjusted so that a coefficient of elongation S for the polarizable electrode can be greater than (R+T)/R and less than or equal to 1.11, where R represents a curvature of an inscribed circle at a bent portion of the polarizable electrode and T represents a thickness of the polarizable electrode.

The method described above can provide the electrode sheet, which is resistant to a crack during its rolling or bending process, for the electric double-layer capacitor having high efficiency in terms of voltage maintenance.

In this connection, the period of time and strength of kneading correlated with the coefficient of elongation S which satisfactorily falls in $(R+T)/R < S \leq 1.11$ have been demonstrated by an experiment or a simulation based on data obtained by the experiment. The conditions applied to the experiment, which include ingredients, a mixing ratio, a thickness of electrode sheet and a method of manufacturing, are fixed for the experiment and simulation.

Yet another aspect of the present invention provides a method, in which one of the period of time and the strength of kneading at the step (a) is adjusted so that a contact angle can be equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

The method of the present invention described above can provide the electrode sheet for the electric double-layer capacitor, which is resistant to a crack and has high efficiency in terms of voltage maintenance and low electric resistance as well as stable performance.

In this connection, the period of time and the strength correlated with the contact angle less than (180-ALPHA) degrees have been demonstrated by an experiment or a simulation based on data obtained by the experiment. The conditions applied to the experiment, which include ingredients, a mixing ratio, a thickness of electrode sheet and a method of manufacturing, are fixed for the experiment and simulation.

It is preferable to select classified granules having a particle diameter of 47–840 micron meters for manufacturing the electrode sheet according to the present invention.

The granules selected this way prevent fine particles of carbon and electrically conductive filler from separating or desorbing from the electrode sheet, so that they may not float in an electrolytic solution or exist between separators. It will enable manufacturing of the electric double-layer capacitor, which has high efficiency in terms of voltage maintenance.

A further aspect of the present invention provides a polarizable electrode for an electric double-layer capacitor, which includes an electrode sheet molded from granules that are produced from ingredients including an electrochemically active material, an electrically conductive filler and a binder, and a collector foil which is bonded with the electrode sheet directly or via a layer of an adhesive so as to form the polarizable electrode which is rolled or bent so as to be applied to the electric double-layer capacitor. In this aspect, a coefficient of elongation S for the polarizable electrode is adapted to be greater than (R+T)/R and less than or equal to 1.11, where R represents a curvature of an inscribed circle at a bent portion of the polarizable electrode and T represents a thickness of the polarizable electrode.

The polarizable electrode for the electric double-layer capacitor described above not only is resistive to a crack during rolling or bending process but also has high efficiency in terms of voltage maintenance as well as the electrode sheet according to the present invention.

A still further aspect of the present invention provides an electric double-layer capacitor including the polarizable electrode described above.

The electric double-layer capacitor according to this aspect has high efficiency in terms of voltage maintenance.

BRIEF DESCRIPTION OF THE DRAWINGS

FIG. 9 is a table showing the measurement results of sample 1, a coefficient of elongation, a contact angle and efficiency for voltage maintenance with regard to a kneading time period.

FIG. 10 is a table showing the measurement results of sample 1, a coefficient of elongation, a contact angle and efficiency for voltage maintenance with regard to a TEFLON mass ratio.

FIG. 11 is a table showing the measurement results of samples 1–4, which have different kneading time periods and mass ratios for ingredients.

DESCRIPTION OF THE PREFERRED EMBODIMENTS

An embodiment of the present invention is now described with reference to the accompanying drawings.

a. Electric Double-layer Capacitor

Figure 1:
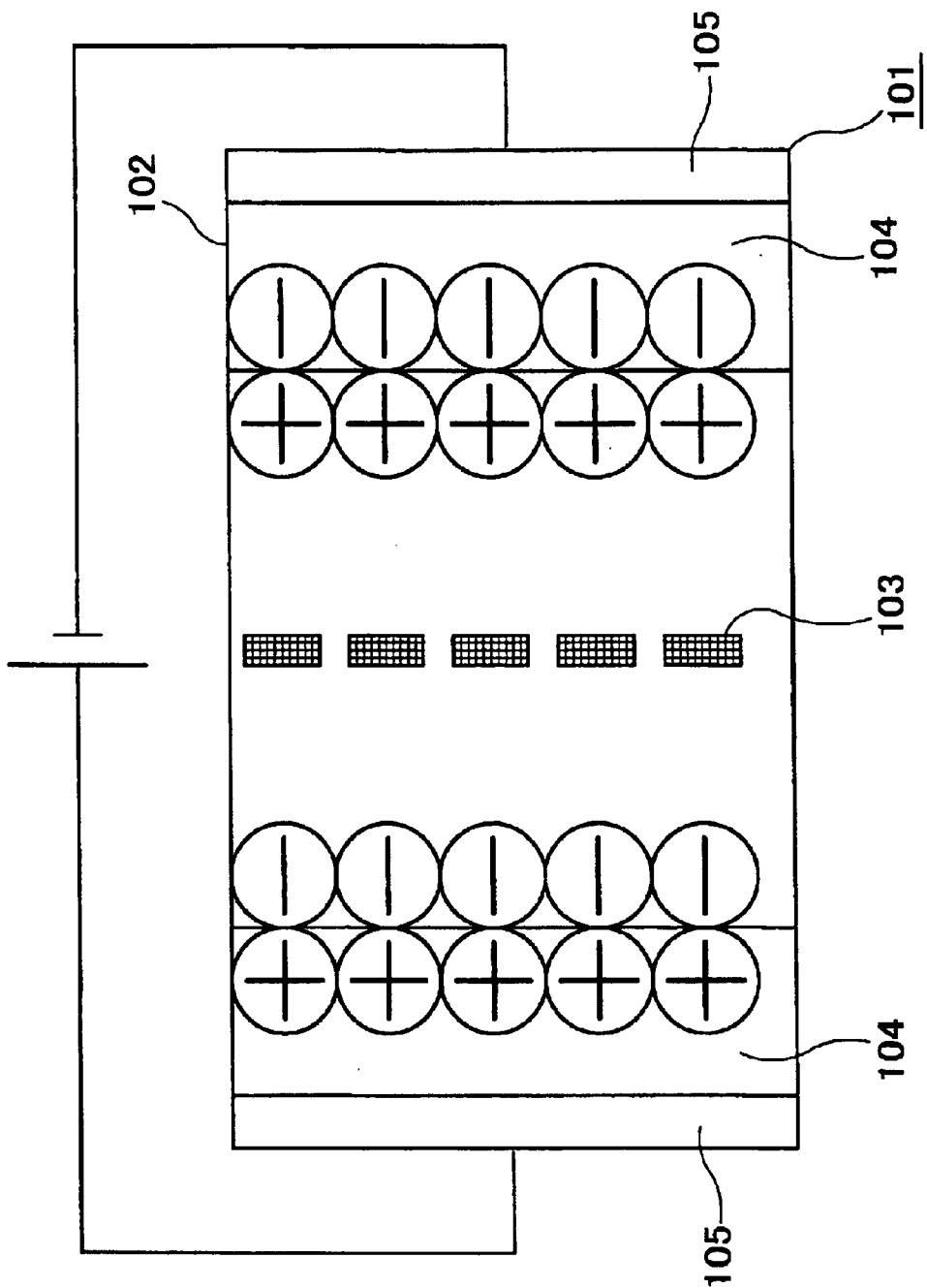
FIG. 1 is a sectional view showing an electric double-layer capacitor.
Figure 2:
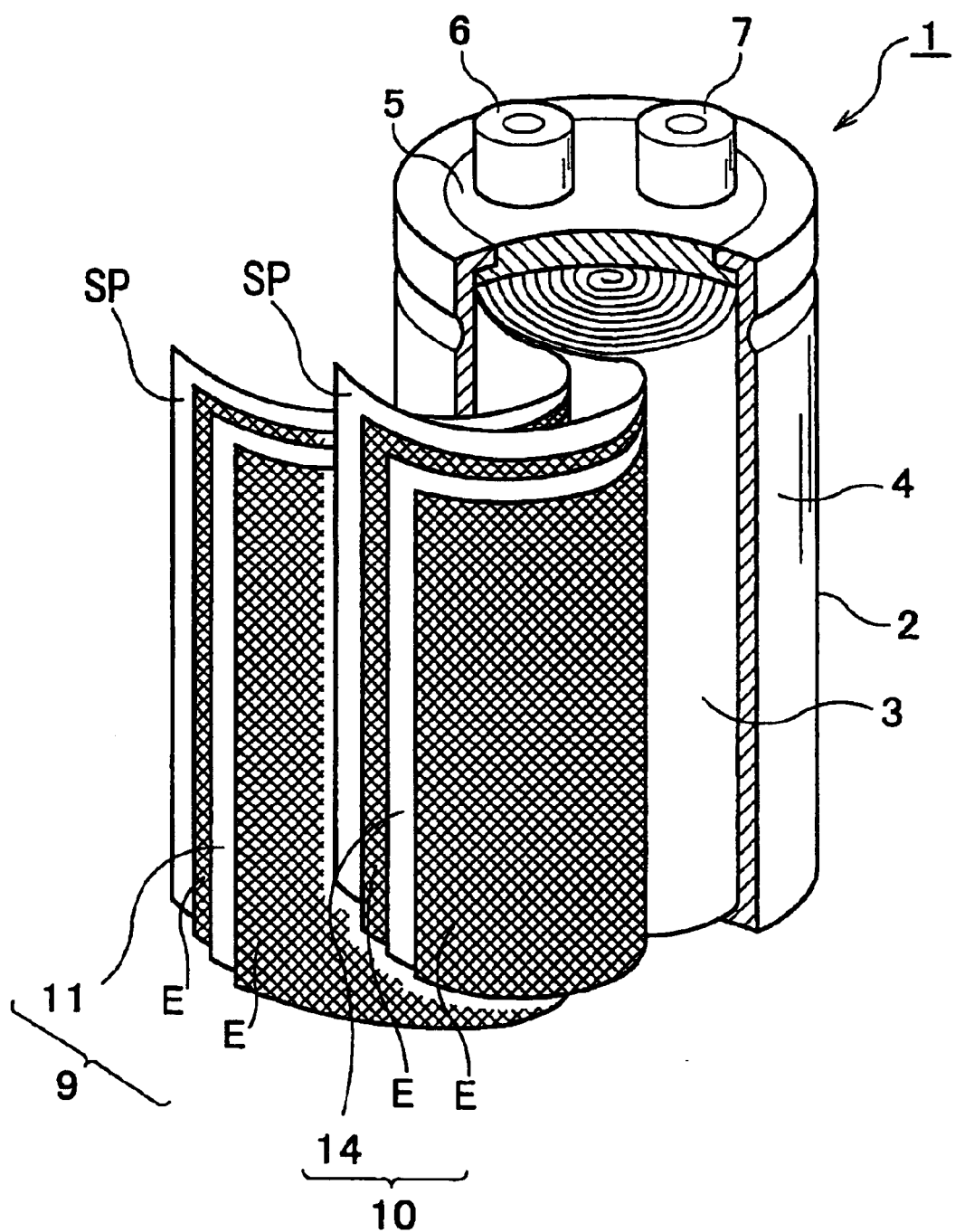
FIG. 2 is a schematic diagram showing an example of the electric double-layer capacitor according to the present invention.
Figure 3A:
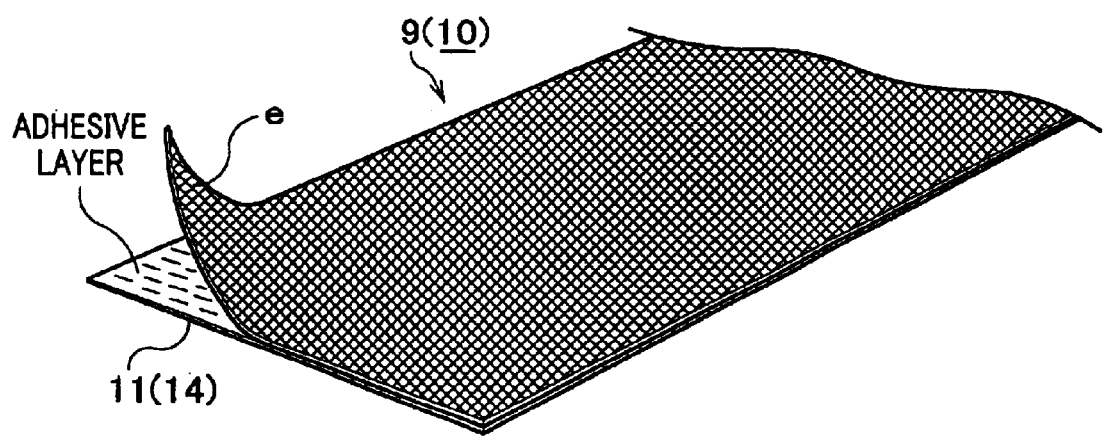
FIG. 3A is a schematic diagram showing a polarizable electrode used for an electric double-layer capacitor.
Figure 3B:
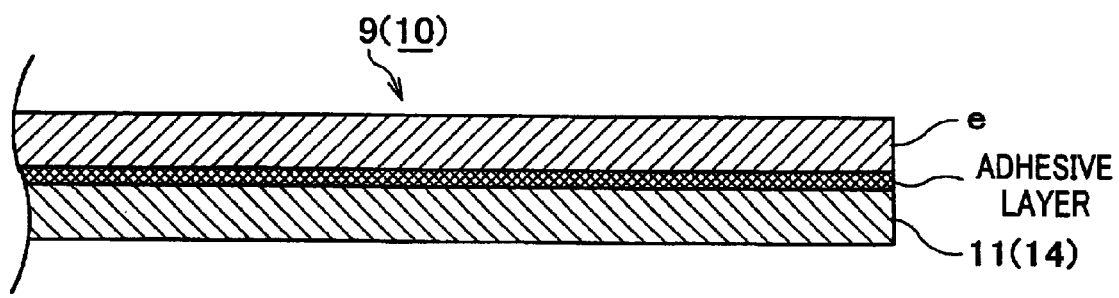
FIG. 3B is a sectional view of the polarizable electrode shown in FIG. 3A.

An electrode sheet and an electric double-layer capacitor which uses polarizable electrodes according to the present invention are described, referring to FIGS. 2, 3A and 3B.

An electric double-layer capacitor 1 shown in FIG. 2 mainly includes a cylindrical casing 2, a rolled electrode 3 which is made of polarizable electrodes 9, 10 and separators SP, and an electrolytic solution filled in the casing 2.

The casing 2 is, for example, made of an aluminum alloy taking into account easy processing and light weight. The casing 2 includes a cylindrical main body 4 with a base and a terminal plate 5 to close its opening, on which positive and negative terminals 6 and 7 are provided, respectively. The terminals 6 and 7 may be located on the opposite sides of the casing 2 instead.

As shown in FIG. 2, the rolled electrode 3 has the polarizable electrode 9 as a positive electrode and the polarizable electrode 10 as a negative electrode.

The polarizable electrode 9 includes a collector foil 11 made of aluminum foil, on each surface of which an electrode sheet E is bonded with an electrically conductive adhesive to serve as a positive film electrode.

The polarizable electrode 10 includes a collector foil 14, on each surface of which an electrode sheet E is bonded with an electrically conductive adhesive to serve as a negative film electrode.

The positive and negative polarizable electrodes 9 and 10 are electrically separated by the separators SP. The rolled electrode 3 is formed in such a manner that the positive and negative polarizable electrodes 9 and 10 are laminated interposing the separators SP.

In this connection, it may be possible to select a separator generally used in the related technical fields, for example paper mixed with resin such as porous olefinic resin (polyethylene or polypropylene) or paper mixed with fiber such as cellulose or polyester.

Figure 4:
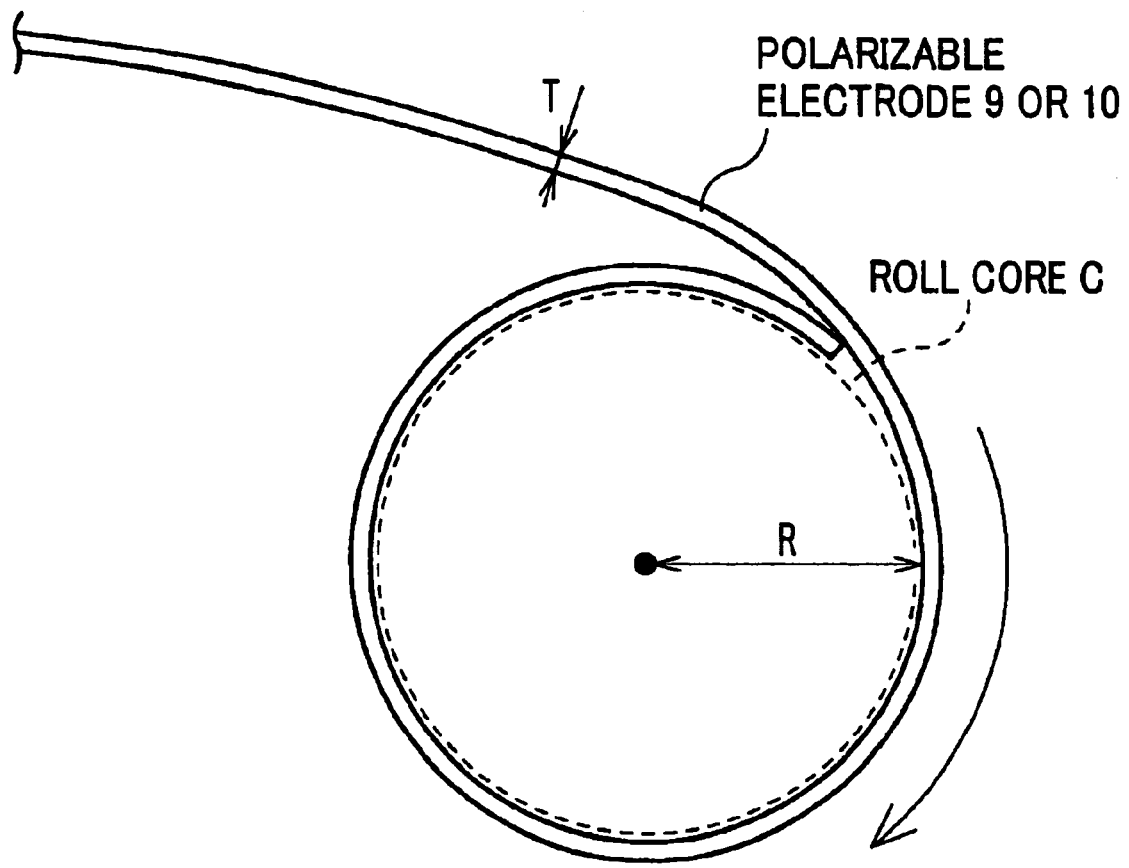
FIG. 4 is a view illustrating the rolling of an electrode sheet according to the invention.

As shown in FIG. 4, the rolled electrode 3 is made of a roll core C of a given radius rolled with the positive and negative polarizable electrodes 9 and 10 interposing the separators SP.

An electrolyte applicable to the electric double-layer capacitor 1 can also be selected from electrolytes which have been used conventionally. Though it is not limited to those, following electrolytes can be named, for example: perchloric acid, hexafluoro phosphoric acid, tetrafluoro boric acid, tetraalkyl ammonium salt or amine salt of trifluoro alkyl sulfonic acid and tetraalkyl ammonium salt or amine salt of tetrafluoro alkyl sulfonic acid.

These electrolytes are solved into a polarizing solvent such as propylene carbonate, gamma butyl lactone, acetonitrile, dimethylhormamide, 1,2-dimethoxy ethane, Sulfolan and nitro ethane, serving as an electrolytic solution.

The polarizable electrodes 9 and 10 are described referring to FIGS. 3A and 3B. As shown in FIGS. 3A and 3B, the polarizable electrodes 9 and 10 are made of collector foils 11 and 14 respectively, one or both surfaces of which are bonded with electrode sheets E. It may be preferable to give surface treatment such as etching for the collector foils 11 and 14 to improve adhesion with the electrode sheets E. An electrode sheet E is molded out of ingredients including an electrochemically active material, an electrically conductive filler and a binder, and formed into a sheet-like shape by rolling.

The electrochemically active material for the electrode sheet E according to the present invention can be selected arbitrarily from known materials used for electric double-layer capacitors, such as activated carbon or carbon fiber. In order to obtain large electrostatic capacity, it may be possible to select activated carbon or activated carbon fiber having a large specific surface, preferably activated carbon produced from graphitized carbon with carbonization and subsequent alkali activation, mesophase pitch, for example.

There is no limitation for the average particle diameter of the electrochemically active material, and those having 1–50 micron meters, preferably 2–15 micron meters can be used. The mass ratio of electrochemically active material relative to the electrode sheet E according to the present invention falls in a known range, namely 50–97 mass percent. If an amount of electrochemically active material is short, it is not possible to realize desired electrostatic capacity. On the other hand, if it is excessive, electrical conductivity tends to deteriorate.

Electrically conductive fine powder used in the related technical field such as carbon black can be used for the electrically conductive filler, which is used for making an electrode conductive. A conventionally known value may be applied to the amount of filler according to the present invention, which is typically 1–30 mass percent. If the amount of filler is short, the electric conductivity of the electrode drops. On the other hand, if it is excessive, electrostatic capacity tends to decrease.

Various binders found in the related technical field can be used for the present invention. Though it is not limited, the following fluororesins can be named, for example: polytetrafluoroethylene (PTFE), ethylene-tetrafluoroethylene copolymer, chlorotrifluoroethylene polymer, fluorovinylidene polymer and tetrafluoroethylene-fluoroalkylvinylether copolymer. It is preferable to select PTFE in the present invention taking into account heat durability and chemical resistance.

An amount of binder, which is a part of electrode granules of an electrode sheet, is an important parameter for determining a contact angle. As described later, the coefficient of elongation for the electrode sheet increases substantially proportional to the amount of binder. It is preferable to select an amount of 2–20 mass percent in the present invention. If the amount of binder is short, the binder can not work sufficiently. On the other hand, if it is excessive, the electrostatic capacity of an electrode decreases. Also the electrical resistance increases since the contact angle reaches too large.

The electrode sheet E according to the present invention, which is made of given ingredients, has a coefficient of elongation falling in a predetermined range.

Figure 5A:
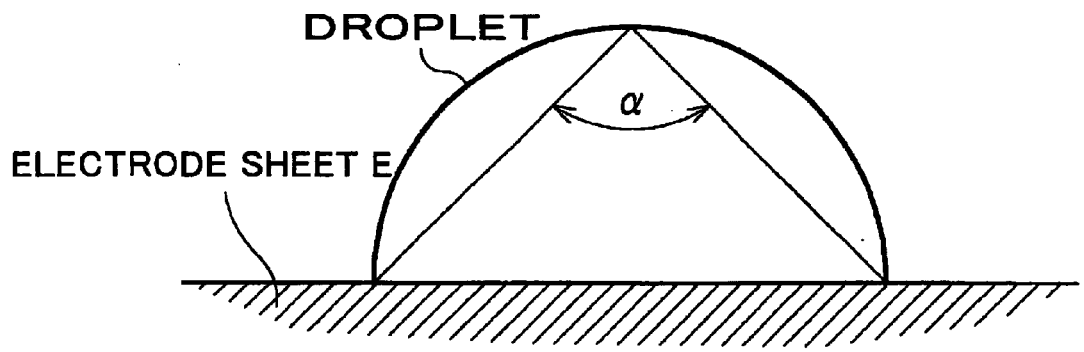
FIGS. 5A–5C are schematic diagrams illustrating the contact angle between an electrode sheet according to the present invention and a droplet of electrolytic solution.
Figure 5B:
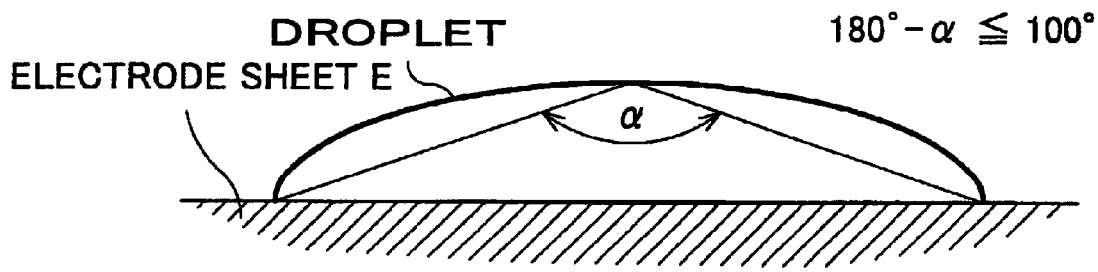
Figure 5C:
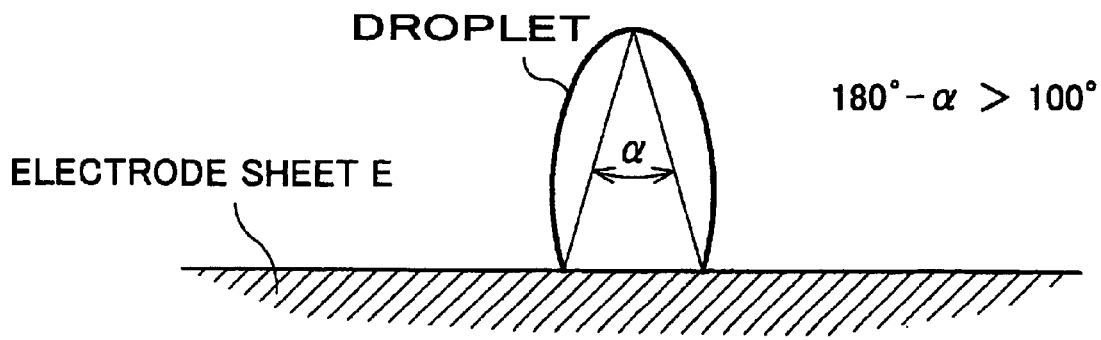

The electrode sheet E is described referring to FIG. 4 and FIGS. 5A–5C. FIG. 4 is a diagram showing the polarizable electrodes 9 and 10 including the electrode sheets E while the polarizable electrodes 9 and 10 are under a rolling process. FIGS. 5A–5C are schematic diagrams showing a contact angle between the surface of electrode sheet E and a droplet of electrolytic solution.

The polarizable electrodes 9 and 10 are rolled around the roll core C, as shown in FIG. 4, forming the rolled electrode 3.

When the polarizable electrodes 9 and 10 having a thickness T are rolled around the roll core C with a radius of R, tensile force according to the curvature of an inscribed circle at a bent portion is applied to the inner surface of polarizable electrodes 9 and 10. Similarly, tensile force related to a radius R+T is exerted on the outer surface.

In this way, if the polarizable electrode 9 or 10 does not have the coefficient of elongation S absorbing the tensile force, the polarizable electrodes 9 and 10, specifically the electrode sheet E, will experience deterioration such as a crack and a break at the bent portion while the polarizable electrodes 9 and 10 are rolled. The present invention provides the coefficient of elongation S greater than (R+T)/R, which prevents the deterioration of electrode sheet E due to the tensile force.

It is preferable to increase an amount of binder or a period of time for kneading ingredients so as to increase the coefficient of elongation S. It should be noted that increasing of binder sometimes leads to deterioration of the electrode sheet E. That is the reason why a maximum value for the coefficient of elongation S is determined as 1.11 in the present invention, for example.

The electrode sheet E of the present invention can be applied not only to an electric double-layer capacitor manufactured with a rolling process but also to another type of capacitor with a bending process.

In addition, the electrode sheet E has surface characteristics, which allow a desirable range of contact angle between a droplet of electrolytic solution and the surface of electrode sheet E.

The contact angle is described in detail referring to FIGS. 5A–5C. As shown in FIG. 5A, the contact angle is defined as (180-ALPHA) degrees where ALPHA is an apex angle of the droplet when it is on the electrode sheet E.

The preferable contact angle of the present invention is less than or equal to 100 degrees, more preferably between 30 and 90 degrees. As shown in FIG. 5B, the wetness of an electrolytic solution to the electrode sheet E increases as the contact angle decreases, so that the electric resistance falls and the efficiency in terms of voltage maintenance rises accordingly. On the other hand as shown in FIG. 5C, when the contact angle grows exceeding the preferable range of the present invention, the wetness decreases and thereby the electric resistance increases.

Repeated experiments of the present invention have demonstrated that when the contact angle is less than or equal to 100 degrees, the electrode sheet E can work efficiently, so that the polarizable electrodes 9 and 10 as well as the electric double layer capacitor 1 can work well.

Once the contact angle exceeds 100 degrees, the electric resistance starts increasing remarkably. It results in a possible decrease in the output of the electric double-layer capacitor 1. On the other hand, the efficiency for voltage maintenance tends to fall as the contact angle decreases. The embodiment of the present invention has selected a preferable range of contact angle 30–90 degrees, which gives appropriate conditions for the electric double-layer capacitor 1 in terms of a balance between the efficiency for voltage maintenance and electric resistance that has an effect on the output of capacitor.

It is preferable to select a range of 47–840 micron meters for the diameter of granule used for the electrode sheet E.

If the granules for electrode sheet include those with a particle diameter less than 47 micron meters, these finer granules remain on the surface of the electrode sheet E. They tend to peel off the surface of electrode sheet E during storage and subsequent processes as well as assembly of the electric double-layer capacitor 1. Especially, after the assembly of electric double-layer capacitor 1, these finer granules peeled off the surface come into separators SP or float in an electrolytic solution, and thereby the efficiency for voltage maintenance may possibly drop.

In this connection, "a particle diameter" is related to an aperture diameter of sieve.

An electric double-layer capacitor 1 is assembled in the following manner, which has not only low electrical resistance but also high efficiency for voltage maintenance. First, granules with a predetermined range of diameter are formed into electrode sheets E, which are subsequently bonded with collector foils 11 and 14 to form polarizable electrodes 9 and 10, respectively, as shown in FIGS. 3A and 3B. The polarizable electrodes 9 and 10 are then installed into a casing 2 to complete the electric double-layer capacitor 1.

b. Manufacturing Method

Figure 6:
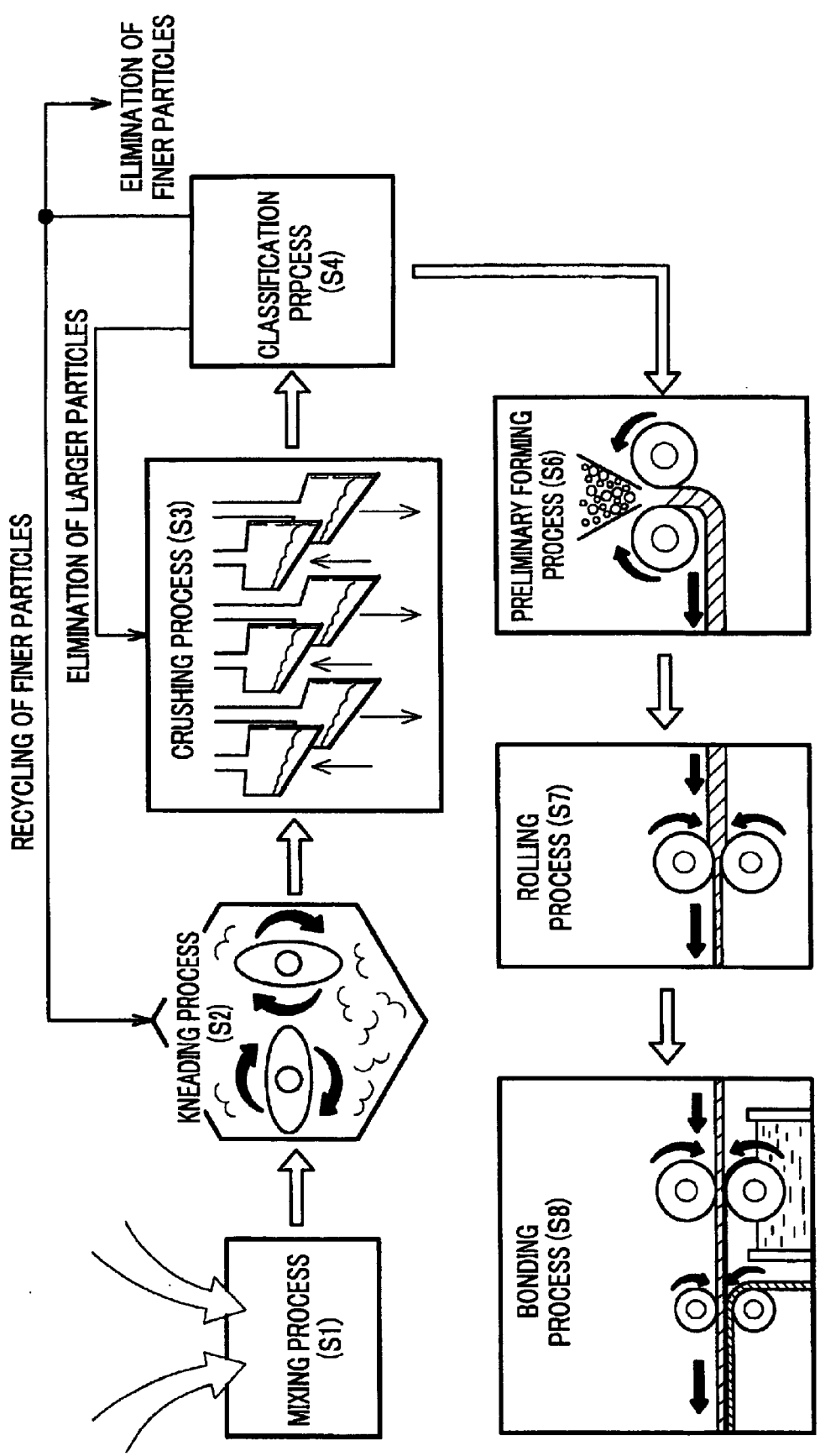
FIG. 6 is a flow diagram illustrating a flow applied to manufacturing of a polarizable electrode for an electric double-layer capacitor.
Figure 7:
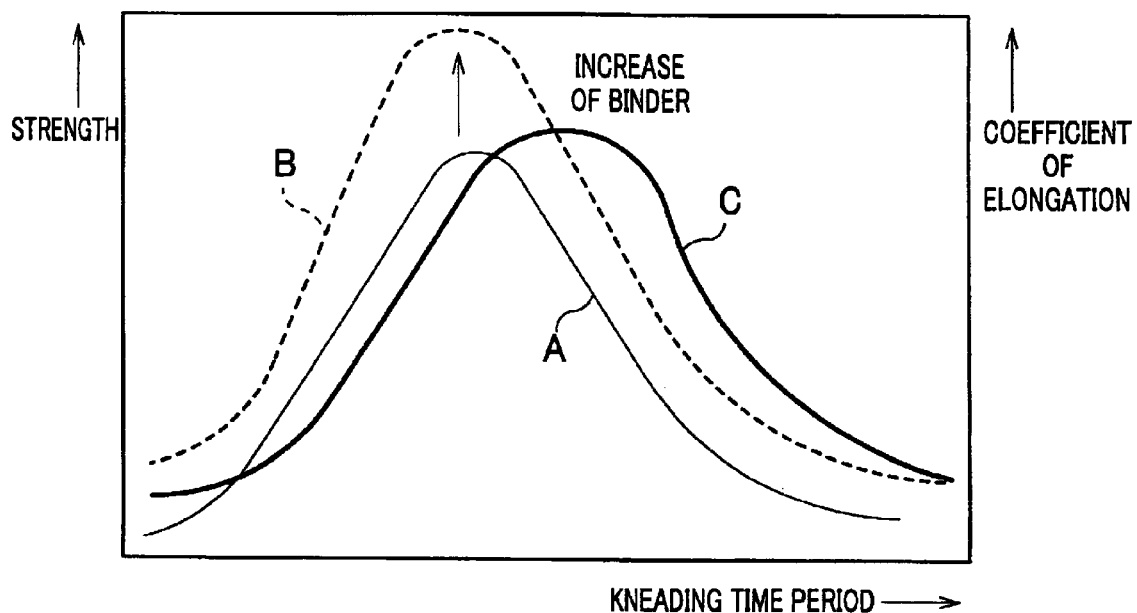
FIG. 7 is a graph showing the relationship between a kneading time period and a coefficient of elongation as well as that between kneading time and the strength of an electrode sheet.
Figure 8:
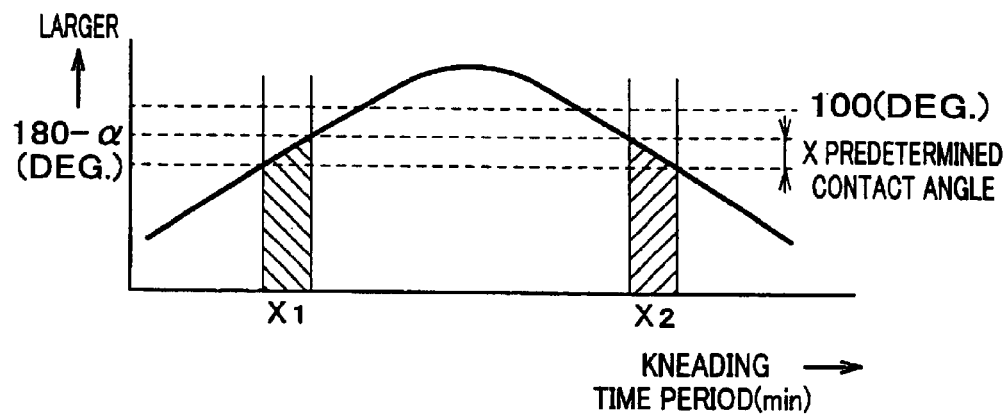
FIG. 8 is a graph showing the relationship between a kneading time period and a contact angle.
Figure 12A:
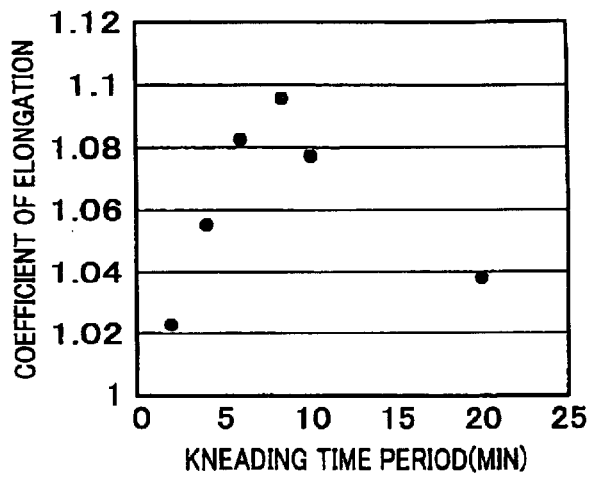
FIG. 12A is a graph showing the relationship between a kneading time period and a coefficient of elongation.
Figure 12B:
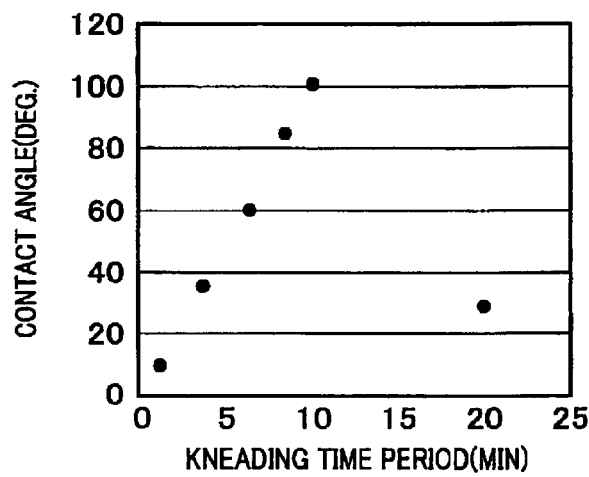
FIG. 12B is a graph showing the relationship between a kneading time period and a contact angle.
Figure 12C:
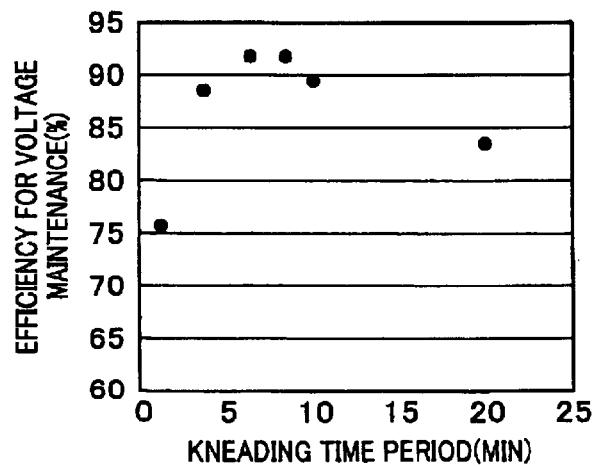
FIG. 12C is a graph showing the relationship between a kneading time period and efficiency for voltage maintenance.
Figure 13A:
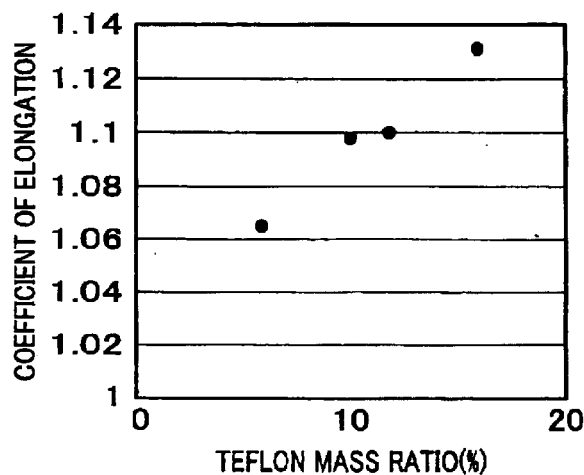
FIG. 13A is a graph showing the relationship between an amount of binder and a coefficient of elongation.
Figure 13B:
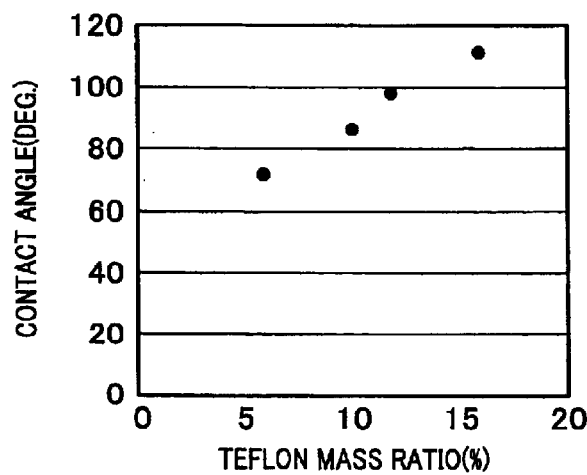
FIG. 13B is a graph showing the relationship between an amount of binder and a contact angle.
Figure 13C:
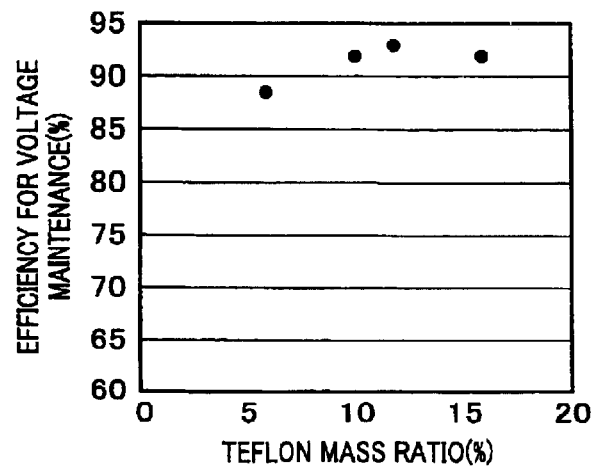
FIG. 13C is a graph showing the relationship between an amount of binder and efficiency for voltage maintenance.

A method for manufacturing the electrode sheets E and the polarizable electrodes 9 and 10 for the electric double-layer capacitor 1 is described with reference to FIGS. 6–8. FIG. 6 is a flow diagram showing a process for manufacturing the electrode sheets E and polarizable electrodes 9 and 10. FIG. 7 is a graph showing the relationship between a time period of kneading and a coefficient of elongation, and the one between the time period of kneading and the strength of electrode sheet E. FIG. 8 is a graph showing the relationship between a time period of kneading and a contact angle. The method is an example and other methods can be applied to the manufacturing process.

Mixing Process

At a step S1, an electrochemically active material, an electrically conductive filler, a binder and additives as required are collected into a mixer and mixed uniformly, for example at several thousands rpm for about 20 minutes.

Kneading Process

At a step S2, the ingredients mixed at the step S1 are kneaded by a machine for kneading, preferably two-axis machine, under heated conditions (for example 60–90 degrees centigrade), at a slow rotational speed (for example 10–40 rpm) and under reduced pressure conditions (for example 0.2–0.5 MPa), for a determined period of time.

Curved lines A and B in FIG. 7 show the relationship between a time period of kneading and a coefficient of elongation. As shown in FIG. 7, the coefficient increases according to the time period and reaches a peak value, decreasing gradually thereafter. The curved line B is for another ingredients which have more amount of binder than those shown by the curved line A.

On the other hand, the curved line C shows the relationship between a time period and strength of an electrode sheet. As comparison between the curved lines A and C indicates, the peak in the strength of electrode sheet appears behind that in the coefficient of elongation.

Therefore, the time period of kneading can be determined empirically after selecting a mixing ratio of ingredients.

As shown in FIG. 8, the contact angle increases according to the time period of kneading and reaches a peak, decreasing thereafter. Assuming that a desired range of contact angle is X, there are two time periods X1 and X2, during which the desired range can be achieved by conducting a kneading process. These two respectively appear before and after the contact angle reaching the peak.

It is preferable to select the earlier one taking into account the deterioration of granules subjected to longer process and saving of process time.

It is noted that graphs shown in FIGS. 7 and 8 are for the ingredients of exemplary composition, which were processed under predetermined conditions such as rotational speed and temperature. It is possible to determine a desirable coefficient of elongation and contact angle depending on the composition of ingredients and the conditions for process.

Graphs similar to FIGS. 7 and 8 can be obtained, by selecting rotational speed for horizontal axis and setting a constant value for the time period.

In this way, a desired electrode sheet E can be manufactured in the following steps. First, a time period for kneading or a rotational speed is set, which allows a desired coefficient of elongation of the electrode sheet E. Second, the time period or rotational speed is finalized so that granules for the electrode sheet E can provide a desired contact angle.

By kneading ingredients under predetermined conditions, it is possible to produce relatively large granules used for the electrode sheet E, which are made of an electrochemically active material and an electrically conductive filler that are bound together by a binder of fibrillation.

Crushing Process

At a step S3, the relatively large particles of granules produced at the step S2 are crushed into an appropriate size of particles suitable for the electrode sheet E of electric double-layer capacitor 1.

Classification Process

The granules crushed at the step S3 include those unsuitable for the electrode sheet E, too fine or large granules. At a step S4, these granules are classified and eliminated. For example, granules having a particle diameter greater than 840 micron meters are eliminated using a sieve of aperture 840 micron meters. It is preferable to return the granules larger than 840 micron meters to the step S3 so that they can be subjected to another round of crushing. Subsequently, too fine granules are eliminated with another sieve of aperture 47 micron meters and thereby the granules satisfying the required range of particle diameter can be selected. It may be possible to return the eliminated granules to the step S2 so that they can be recycled.

The sequence of classification can be selectively determined. For example, finer granules are classified before larger ones, which is the opposite sequence of process compared to that described above.

Preliminary Forming Process

The granules subjected to the steps S1–S4 undergo preliminary forming at a step S6, being molded into a pre-electrode sheet.

It is possible to conduct forming at the step S6 by introducing a conventional method, for example a pair of rollers with a predetermined gap through which the granules for an electrode sheet E with a solution such as isopropanol pass.

Rolling Process

At a step S7, the pre-electrode sheet is rolled to a predetermined thickness. It is possible to conduct a rolling process at the step S7 by making the pre-electrode sheet pass a conventional roller. For example, if the thickness of 130–160 micron meters for the electrode sheet E is desired, it is possible to make the thickness smaller gradually using three types of roller of different gaps. The rollers are laid out so that one having a smaller gap is situated downstream. This approach protects against defects such as breaking of the electrode sheet E since it precludes a chance of exerting sudden large load on the electrode sheet E.

It is not limited to the rolling process described above, in which the electrode sheet E passes through plural types of roller consecutively. Alternatively, it is possible to make the electrode sheet E pass through the rollers step by step.

The electrode sheet E described above, which is manufactured using granules that have the predetermined range of particle diameter without undesirably fine or large particle selected by a sieve, can be free from having fine particles on its surface.

Bonding Process

Next, polarizable electrodes 9 and 10 of the present invention are manufactured at a step S8 by bonding electrode sheets E with the collector foils 11 and 14. A bonding process shown in FIG. 6 is used, which has a first roller that applies an adhesive to the collector foils 11 and 14 in a predetermined thickness, and a second roller that conducts bonding by pressure for the collector foils 11 and 14 with the electrode sheets E.

In this connection, in a case where collector foils 11 and 14, both surfaces of which are bonded with electrode sheets E, it may be possible to conduct the step S8 for one of the two surfaces at a time.

The collector foils 11 and 14, either one surface of which is bonded with an electrode sheet E or both surfaces of which are bonded with electrode sheets E, are dried using a conventional method. In this way, the manufacturing of polarizable electrodes 9 and 10 is completed.

Although the electrically conductive adhesive has been described above in the explanation for bonding of the electrode sheets E with the collector foils 11 and 14, it may be possible to apply crimp instead of the adhesive.

Electrode samples have been manufactured and their characteristics have been studied by measurement. It is understood that the present invention should not be limited to the exemplary cases described below based on the samples.

Sample 1

Activated carbon having a median diameter of nearly 6 micron meters was used as an electrochemically active material, with which acetylene black as an electrically conductive filler and TEFLON (trade mark) as a binder were mixed. The composition ratio of these three materials, the activated carbon, the acetylene black and the TEFLON, was 82:8:10. This mixture added with isopropyl alcohol underwent a kneading process under pressurization for fibrillation of the TEFLON for 8 minutes, thereby resulting in a kneaded compound. The compound was then crushed, becoming crushed powder having an average diameter of 1 mm. The crushed powder was further added with isopropyl alcohol and was subjected to a calender process so as to be a sheet-like molding. The molding underwent a rolling process, resulting in an electrode sheet. The electrode sheet was bonded to a collector foil, forming a polarizable electrode having a thickness of 0.4 mm. A tape G-5780A made by Notape Co. Ltd. was used for bonding.

The polarizable electrode was cut to a desired length and rolled around a roll core having a radius of 5 mm with two sheets of separator having a thickness of 50 micron meters. The rolled electrode was housed in an experimental casing, which was then subjected to a drying process under a vacuum condition at 160 degrees centigrade for 72 hours. An electrolytic solution, propylenecarbonate solution having a concentration of 1.8 mol/L of quaternary ammonium salt, was injected into the casing. In this way, an experimental electric double-layer capacitor was manufactured.

The experimental electric double-layer capacitor was then subjected to an impregnation process and an aging process for degassing. And it was charged to 2.5 volts. After completion of charging, the experimental electric double-layer capacitor was left as it was for 312 hours, and its voltage was measured. And the efficiency for voltage maintenance was calculated according to the measured voltage. A rectangle sheet of 15 mm by 50 mm was cut out of the polarizable electrode and subjected to a tensile stress test. The elongation of the polarizable electrode was defined as that obtained from the start of application of tension to the start of rupture while the test was conducted at the rate of 5 mm/min.

Other electrode sheets were manufactured, which had different kneading periods of time such as 2, 4, 6, 10 and 20 minutes, and their contact angle and electrical resistance were measured. Also, other electrode sheets were manufactured with varied composition ratios of TEFLON such as 6, 12 and 16 percent, and the same measurement was conducted. The results are shown in FIGS. 9 and 10.

The contact angle was measured using a fixed camera which enlarged a droplet of nearly 20 micron litters of an electrolytic solution, which was held on the end of a micro syringe and attached on the surface of electrode sheet.

In this connection, since a roll core having a radius R of 5 mm and a polarizable electrode having a thickness T of 0.4 mm were used in the present sample, a coefficient of elongation S is greater than 1.08 and less than or equal to 1.11 ($1.08 < S \leq 1.11$).

The results of FIG. 9 show that the coefficient of elongation and contact angle increase according to the kneading time period, and they start decreasing when the time exceeds 10 minutes (compare to FIGS. 7 and 8).

Similarly, the results of FIG. 10 show that that the coefficient of elongation, contact angle and efficiency for voltage maintenance increase according to the amount of binder.

Samples 2–4

Mass ratio among activated carbon, acetylene black and TEFRON as well as kneading time period were varied according to FIG. 11 and the measurement was conducted. The results are shown in FIG. 11, FIGS. 12A–12C and FIGS. 13A–13C. The results of sample 1 are also shown in FIG. 11 along with those of samples 2–4.

It is known from FIG. 11, FIGS. 12A–12C and FIGS. 13A–13C that the kneading time period and the coefficient of elongation are correlated to each other, and the amount of binder and the coefficient of elongation are also correlated to each other. The results demonstrate that higher efficiency for voltage maintenance can be achieved by the sample electrode sheets prepared according to the present invention.

What is claimed is:

1. An electrode sheet for an electric double-layer capacitor, the electrode sheet is molded from granules which are produced from ingredients comprising:
    an electrochemically active material;
    an electrically conductive filler; and
    a binder,
    wherein the electrode sheet is bonded with a collector foil so as to form a polarizable electrode which is rolled or bent so as to be applied to the electric double-layer capacitor, and
    wherein a coefficient of elongation S for the polarizable electrode is adapted to be greater than (R+T)/R and less than or equal to 1.11, where R represents a curvature of an inscribed circle at a bent portion of the polarizable electrode and T represents a thickness of the polarizable electrode.

2. An electrode sheet according to claim 1 wherein a contact angle is equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

3. A method for manufacturing an electrode sheet for an electric double-layer capacitor, the electrode sheet is molded from granules which are produced from ingredients including an electrochemically active material, an electrically conductive filler and a binder, and the electrode sheet is bonded with a collector foil so as to form a polarizable electrode which is rolled or bent so as to be applied to the electric double-layer capacitor, the method comprising the steps of:
    (a) kneading the ingredients so that the binder is subjected to fibrillation, and molding a lump out of the ingredients after the fibrillation;
    (b) crushing the lump into granules for the electrode sheet of the electric double-layer capacitor; and
    (c) forming the granules into the electrode sheet,
    wherein one of a period of time and strength of kneading at the step (a) is adjusted so that a coefficient of elongation S for the polarizable electrode can be greater than (R+T)/R and less than or equal to 1.11, where R represents a curvature of an inscribed circle at a bent portion of the polarizable electrode and T represents a thickness of the polarizable electrode.

4. A method according to claim 3 wherein one of the period of time and the strength of kneading at the step (a) is adjusted so that a contact angle can be equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

5. A polarizable electrode for an electric double-layer capacitor comprising:
    an electrode sheet molded from granules which are produced from ingredients including an electrochemically active material, an electrically conductive filler and a binder; and
    a collector foil which is bonded with the electrode sheet directly or via a layer of an adhesive so as to form the polarizable electrode which is rolled or bent so as to be applied to the electric double-layer capacitor,
    wherein a coefficient of elongation S for the polarizable electrode is adapted to be greater than (R+T)/R and less than or equal to 1.11, where R represents a curvature of an inscribed circle at a bent portion of the polarizable electrode and T represents a thickness of the polarizable electrode.

6. A polarizable electrode according to claim 5 wherein a contact angle is equal to or less than 100 degrees when the contact angle is defined as (180-ALPHA) degrees, where ALPHA represents an apex angle of a droplet of an electrolytic solution for the electric double-layer capacitor, and when the droplet lies on the electrode sheet.

7. An electric double-layer capacitor comprising the polarizable electrode according to claim 5.

* * * * *